United States Patent [19]

Oyama

[11] Patent Number: 4,979,204
[45] Date of Patent: Dec. 18, 1990

[54] RADIO TELEPHONE SYSTEM HAVING EMERGENCY SPEECH CONTROL

[75] Inventor: Mitsukazu Oyama, Hachioji, Japan
[73] Assignee: Fujitsu Limited, Kawasaki, Japan
[21] Appl. No.: 461,709
[22] Filed: Jan. 8, 1990
[30] Foreign Application Priority Data Jan. 12, 1989 [JP] Japan ..................................... 1-5605

[51] Int. Cl.$^5$ ............................................. H04Q 7/04
[52] U.S. Cl. ...................................... 379/46; 379/45; 379/58
[58] Field of Search ...................... 379/37, 46, 49, 58, 379/59, 63, 45

[56] References Cited
U.S. PATENT DOCUMENTS

4,860,337 8/1989 Shimura ................................. 379/58
4,890,315 12/1989 Bendixen et al. ..................... 379/58

Primary Examiner—Jin F. Ng
Assistant Examiner—Stella L. Woo
Attorney, Agent, or Firm—Armstrong, Nikaido, Marmelstein, Kubovcik & Murray

[57] ABSTRACT

A radio telephone system includes a subscriber exchanger accommodating a plurality of subscribers and a plurality of emergency call receiving devices each having a transmission function, a line exchanger interfacing with the subscriber exchanger, emergency speech office lines provided between the subscriber exchanger and the line exchanger, a plurality of channels coupling mobile stations and the line exchanger, and emergency speech extension lines coupled to the line exchanger and corresponding to the emergency speech office lines one by one.

15 Claims, 7 Drawing Sheets

| A | B | C | D | E |
|---|---|---|---|---|
| #1 | All "0" | 1 | 0 | 0 |
| #2 | All "0" | 1 | 0 | 0 |
| ⋮ | ⋮ | ⋮ | ⋮ | ⋮ |
| #h | MOBILE SUBSCRIBER NO. #M | 0 | 0 | 1 |
| ⋮ | ⋮ | ⋮ | ⋮ | ⋮ |
| #n | #Z | 0 | 1 | 0 |

RADIO TELEPHONE SYSTEM HAVING EMERGENCY SPEECH CONTROL

BACKGROUND OF THE INVENTION

The present invention generally relates to a radio telephone system and, more particularly, to an emergency speech control in a mobile radio telephone system coupled to a public services telephone network.

Conventionally, a radio telephone system is known in which a communication path between a subscriber accommodated in a public services telephone network (hereafter simply referred to as a PSTN) and a mobile subscriber is established based on a multi-channel access procedure.

Figure 1:
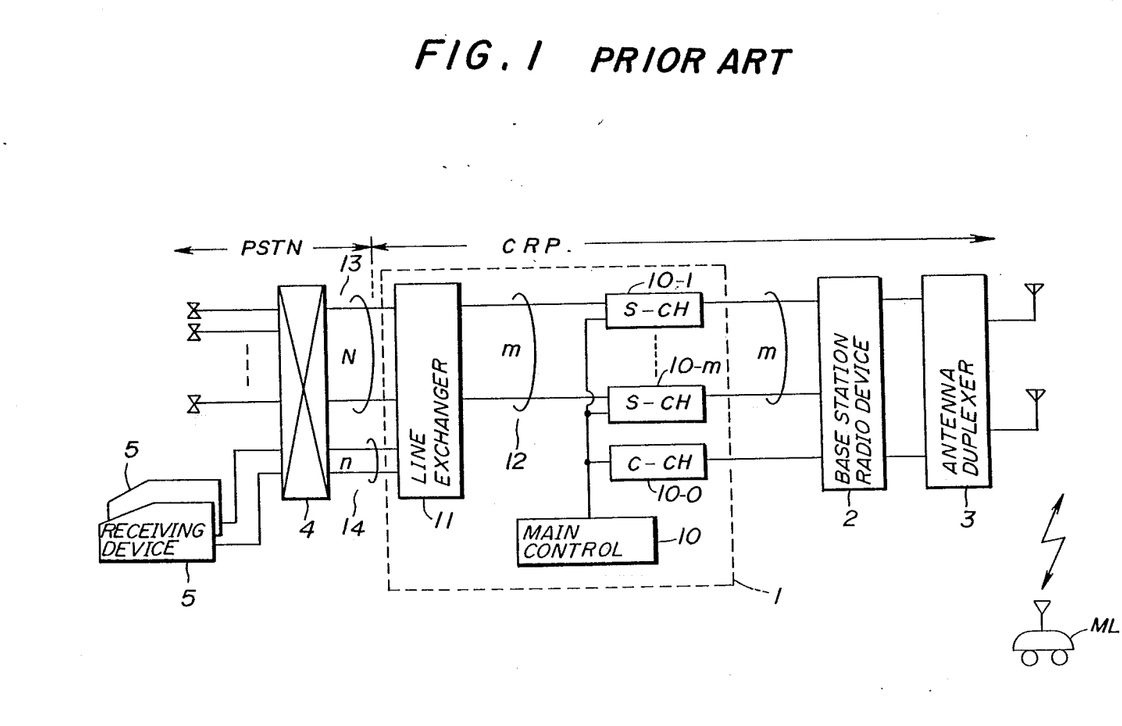
FIG. 1 is a block diagram of a conventional radio speech system.

Referring to FIG. 1, there is illustrated a conventional radio telephone system which employs a multi-channel access procedure. The illustrated radio telephone system comprises a PSTN and a convenient radio phone system (hereafter simply referred to as a CRP) system. The CRP system is composed of a line control device 1, a base station radio device 2, and an antenna duplexer 3. The base station radio device 2 radio-communicates with a mobile station ML through the antenna duplexer 3 and an antenna 3-1 or 3-2 coupled thereto. In the illustrated system, $m < < P$ is satisfied where m is the number of channels for use in speech communication, and P is the number of the mobile stations (subscribers) ML. The number m of channels is equal to the number of radio channels.

The line control device 1 includes a main controller 10, a control channel controller 10-0, m speech channel controllers 10-1–10-$m$, and a line exchanger 11. There are m speech extension lines 12 between the line exchanger 11 and the speech channel controllers 10-$l$–10-$m$. The line exchanger 11 exchanges m speech extension lines 12 with N normal speech office lines 13 and n emergency speech office lines 14 (n is an integer). The normal speech office lines 13 and the emergency speech office lines 14 are connected to a subscriber exchanger 4 of the PSTN. The subscriber exchanger 4 accommodates a plurality of subscribers (not shown). Further the exchanger 4 accommodates a plurality of emergency call receiving devices 5 for use in emergency speech communication.

When the illustrated mobile subscriber ML requests a speech communication with a PSTN subscriber, the base station radio device 2 distinguishes a speech request from the illustrated mobile subscriber ML from other communications, and notifies the control channel controller 10-0 of this speech request. The communication channel controller 10-0 temporarily holds the present speech request, and then notifies the main controller 10 of the same. The main controller 10 supervises the m speech channels. When any one of the speech channels becomes available, the main controller 10 allocates the available speech channel to the speech request on the basis of a predetermined priority of speech requests. That is, when the speech request from the illustrated mobile subscriber ML has the highest priority among other competing speech requests, the available speech channel is allocated to the speech request from the illustrated mobile subscriber ML. Then a communication path between the called PSTN subscriber and the mobile subscriber ML is established through the exchangers 11 and 4.

However, a conventional radio speech system such as the above-mentioned system has the following disadvantages. When the mobile subscriber ML requests an emergency speech by dialing a specific dial number ("110" or "119" in Japan), a speech channel between available one of the emergency call receiving devices 5 and the mobile subscriber ML is established. Then the established speech channel is held without being released for a while even after the emergency speech is finished. This is due to the fact that in some cases the operator of the emergency call receiving device 5 wishes to inquire of the mobile subscriber ML something. In the speech channel holding state after finishing the emergency speech, the established speech channel cannot be used for another speech processing. For this reason, the efficiency in using m speech channels 12 is not high. Further, after releasing the established speech path from the holding state, even if the operator of the emergency call receiving device 5 wishes to communicate with the mobile subscriber ML which requested the emergency speech, the operator cannot have access to the mobile subscriber ML. An analogous problem occurs when the base station radio device 2 cannot receive a radio signal from the mobile subscriber ML for a fixed time, when the mobile subscriber ML is in a tunnel, for example. In this case, the established speech path is released and thus the operator of the emergency call receiving device 5 cannot access the mobile subscriber ML.

SUMMARY OF THE INVENTION

It is a general object of the present invention to provide an improved radio speech system in which the aforementioned disadvantages are got rid of.

A more specific object of the present invention is to provide a radio speech system in which emergency speech is processed with increased speech channel efficiency.

The above-mentioned objects of the present invention are achieved by a radio telephone system comprising a subscriber exchanger accommodating a plurality of subscribers and a plurality of emergency call receiving devices each having a transmission function; a line exchanger interfacing with the subscriber exchanger; emergency speech office lines provided between the subscriber exchanger and the line exchanger; a plurality of channels coupling mobile stations and the line exchanger; and emergency speech extension lines coupled to the line exchanger and corresponding to the emergency speech office lines one by one. The system further comprises first control means for coupling a mobile station which is one of the mobile stations and requests an emergency speech to one of the emergency call receiving devices through one of the channels, the line exchanger, one of the emergency speech office lines and the subscriber exchanger; memory means for storing a subscriber number of the mobile station which requests the emergency speech; ringing signal detecting means for detecting a ringing signal supplied from the one of the emergency call receiving devices through the one of the emergency speech office lines and a corresponding one of the emergency speech extension lines and directed to the mobile station which precedingly requests the emergency speech and for generating a detection signal when detecting the ringing signal; and second control means for reading out the subscriber number of the mobile station from the memory means when the detection signal is supplied from the ringing signal detecting means and for coupling the one of the emergency call receiving devices to the mobile station through the subscriber exchanger, the one of the emergency speech office lines, the subscriber exchanger and one of the channels.

Additional objects, features and advantages of the present invention will become apparent from the following detailed description when read in conjunction with the accompanying drawings.

DESCRIPTION OF THE PREFERRED EMBODIMENTS

Figure 2:
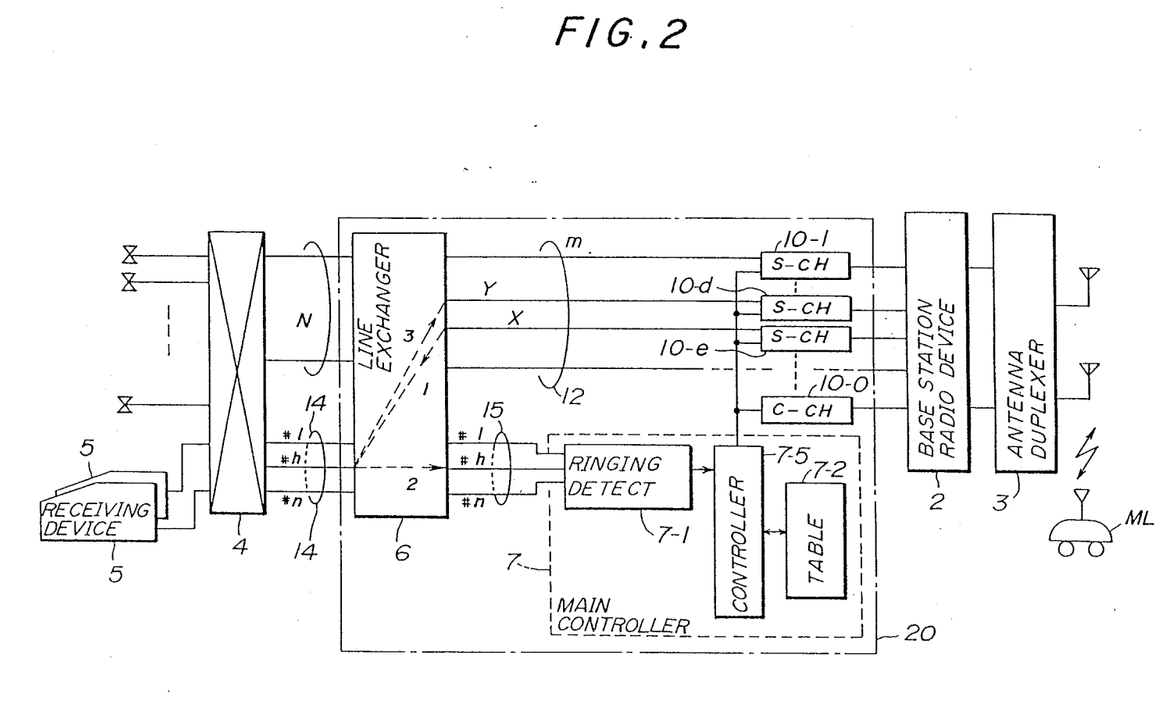
FIG. 2 is a block diagram illustrating an outline of the present invention.

A description is given of an outline of the present invention with reference to FIG. 2. A line controller 20 according to the present invention includes a main controller 7 substituted for the aforementioned main controller 10 (FIG. 1), n emergency speech extension lines 15 between the line exchanger 6 and the main controller 7, in addition to the aforementioned n emergency speech office lines 14. The n emergency speech extension lines 15 correspond to n emergency speech office lines 14 one by one. For example, the emergency speech office line #1 is connected to the emergency speech extension line #1 through the line exchanger 6. With this connection, it becomes possible to check the status of the emergency speech office line #1 from the side of the corresponding emergency speech extension line #1. The main controller 7 is composed of a ringing signal detector 7-1, a table memory 7-2 and a controller 7-5. The ringing signal detector 7-1 detects a ringing signal which is generated by a corresponding one of the emergency call receiving devices 5 and passes through a corresponding one of the emergency speech extension lines 15. The emergency call receiving device 5 generates a ringing signal when it requests to communicate with a mobile subscriber which requested an emergency call which was terminated at the present emergency call receiving device 5, or in other words, when it generates a return call directed to the above-mentioned mobile subscriber. The table memory 7-2 stores a table in which the status of each of the emergency speech office lines 14 is stored.

An emergency speech from the illustrated mobile subscriber ML is once held by the control channel controller 10-0. Then the controller 7-5 allocates the emergency speech request to an idle speech extension line X connected to the speech channel controller 10-e. Then the line exchanger 6 connects the speech extension line X to an emergency speech office line #h through a route ① formed in the line exchanger 6. Thereby, the speech extension line X is connected to a corresponding one of the emergency call receiving devices 5 through the route ① and the subscriber exchanger 4. During this time, the controller 7-5 receives the subscriber number of the mobile subscriber ML which requested the emergency speech from the speech channel controller 10-e, and writes the subscriber member #M of the mobile subscriber ML in a storage area of the table memory 7-2 assigned to the emergency speech office line #h. After the emergency speech is finished, the operator of the mobile subscriber ML sets a handset thereof in the on-hook state and then the speech extension line X is released from the exclusively used state. Thus, the speech extension line X becomes idle and is permitted to be allocated to another mobile subscriber.

When the operator of the emergency call receiving device 5 which terminates the aforementioned emergency speech wishes to call the mobile subscriber ML which was connected to the speech extension line X, the operator depresses a key (not shown) provided on the emergency call receiving device 5 or takes up the handset, for example. In response to this manual operation, a ringing signal to be directed to the mobile subscriber ML is generated and supplied to the ringing signal detector 7-1 through the emergency speech office line #h and the emergency speech extension line #h (a route ②). The line exchanger 6 has been programed so that the emergency speech office line #h is connected to the emergency speech extension line #h without exception. The ringing signal detector 7-1 distinguishes the ringing signal supplied from the emergency speech office line #h from those for the other emergency speech office lines, and lets the controller 7-5 know the detection of the ringing signal from the emergency speech office line #h. Then the controller 7-5 accesses the storage area related to the emergency speech office line #h and reads out the contents thereof. In the present access, the subscriber number of the mobile subscriber ML has been stored in the emergency speech office line #h. Then the controller 7-5 selects a speech extension line Y which is available at present. Thereby, a route ③ is established and the operator of the emergency call receiving device 5 can communicate with the mobile subscriber ML.

Figure 3:
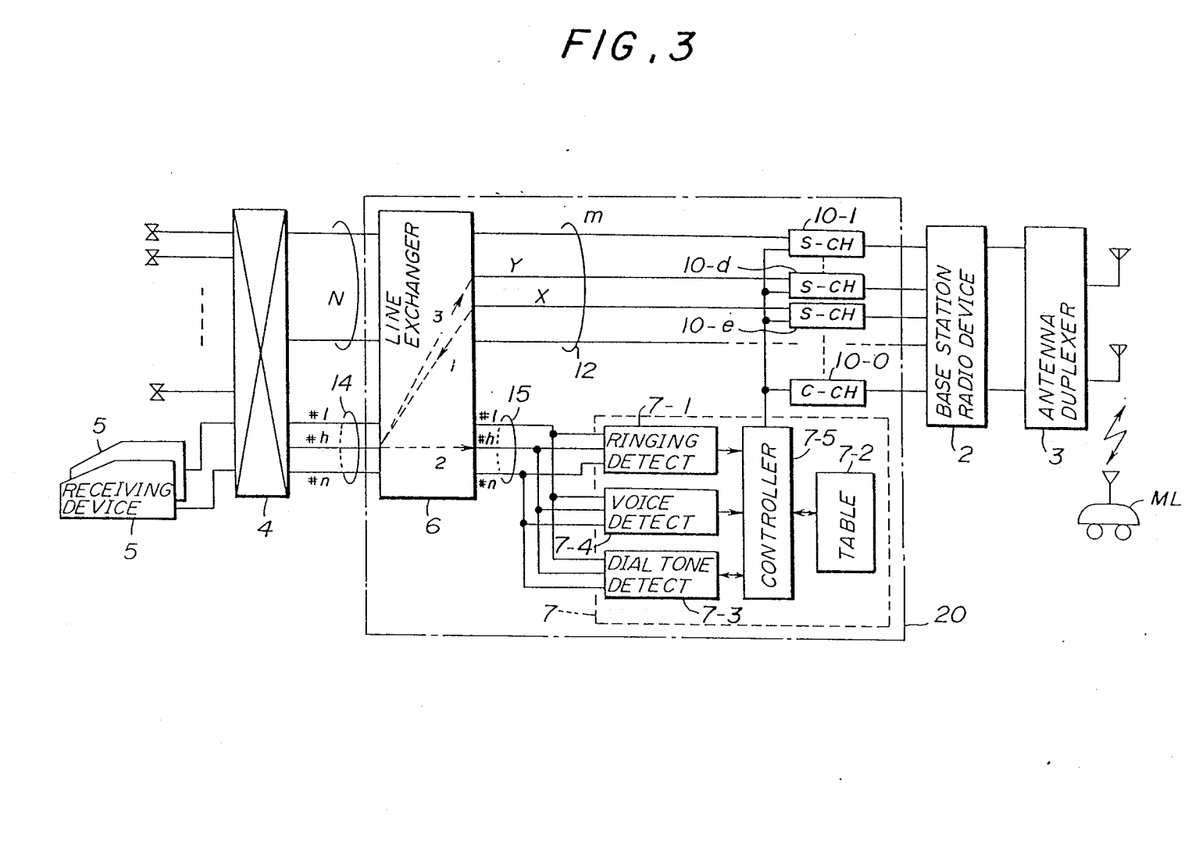
FIG. 3 is a block diagram of a preferred embodiment of the present invention.

FIG. 3 is a block diagram of a preferred embodiment of the present invention. In FIG. 3, those parts which are the same as those in the previous figures are given the same reference numerals. The main controller 7 includes a speech detector 7-4 and a dial tone detector 7-3 in addition to the ringing signal detector 7-1, the table memory 7-2 and the controller 7-5.

The ringing signal detector 7-1 detects the ringing signal of the return call which is sent from the emergency call receiving device 5 through the corresponding emergency speech office line 14 and which is directed to the mobile subscriber ML which requested the emergency speech, and notifies the controller 7-5 of the office line number allocated to the associated emergency speech office line 14. In the operation described previously with reference to FIG. 2, the ringing signal detector 7-1 detects the ringing signal from the emergency speech office line #h and notifies the controller 7-5 of its number (also #h).

Figure 4:
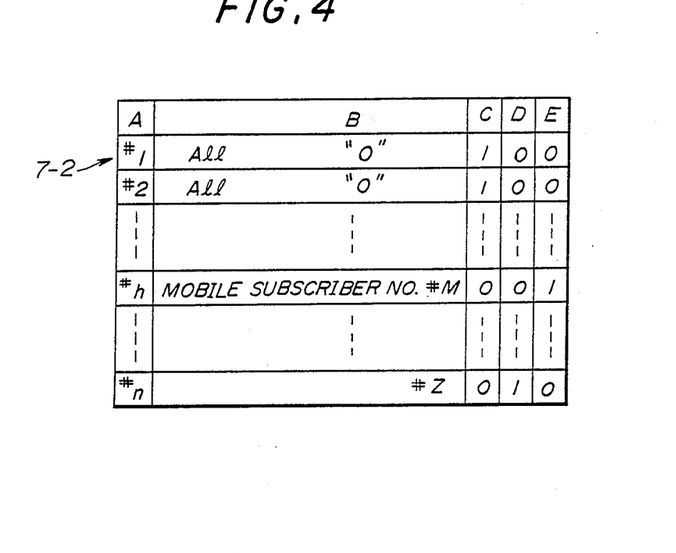
FIG. 4 is a diagram illustrating the contents of a table memory shown in FIGS. 2 and 3.

The table memory 7-2 stores a table used for managing the status of each of the emergency speech office lines 14. The table is configured as shown in FIG. 4. The table has storage areas allocated to the individual emergency speech office lines #1 -#n. Each of the storage areas has an area A which stores the number of the corresponding emergency speech office line, an area B registering a mobile subscriber number, an area C indicating information on whether the corresponding emergency speech office line is idle, an area D indicating that the corresponding emergency speech office line is busy, and an area E which registers a flag indicating that the corresponding emergency speech office line is in a return call (ringing) waiting state where the corresponding emergency speech office line is waiting for the outputting of a ringing signal based on a return call which is directed to a mobile subscriber from the corresponding emergency call receiving device 5. The area A which stores the number of the emergency speech office line 14 may be omitted because a group of the areas A–E is arranged in order of number. Numeral "1" in the area C represents that the corresponding emergency speech office line is idle. Numeral "1" in the area D represents that the corresponding emergency speech 1 office line is being used. Numeral "1" in the area "1" represents that the corresponding emergency speech office line is in the return call waiting state.

The dial tone detector 7-3 periodically executes a call-out operation in which it calls up the emergency call receiving devices 5 through the emergency speech extension lines 15 and determines whether the emergency call receiving devices 5 have been released from the return call waiting state. This is directed to preventing an emergency call from terminating at the emergency call receiving device 5 which is maintained in the return call waiting state. When the operator releases its own emergency call receiving device 5 from the return call waiting state and thus makes the emergency call receiving device 5 open to any mobile stations, the emergency call receiving device 5 sends a dial tone indicating that the handset is in the on-hook state in response to the call-out operation from the dial tone detector 7-3. This is because when the dial tone detector 7-3 makes a call to the emergency call receiving device 5 or sends a ringing signal thereto, a D.C. loop relating to the corresponding emergency speech office line 14 is formed. Thus, it is possible to determine whether the emergency call receiving devices 5 have been made open to any mobile stations by detecting the presence/absence of the response to the dial tone at predetermined intervals.

The speech detector 7-4 detects the presence/absence of voice of the operators of the emergency call receiving devices 5 by referring to the emergency speech extension lines 15 which are in the ringing waiting status. For example, in a case where the emergency call receiving device 5 associated with the emergency speech office line #1 which is currently in the ringing waiting status and is being accessed by the dial tone detector 7-3 so that the D.C. loop is formed, when the present emergency call receiving device just generates a ringing signal directed to the mobile subscriber which has just finished the emergency device 5 through the emergency speech office line #1, the ringing signal detector 7-1 cannot detect the ringing signal. For this reason, the above-mentioned ringing signal is detected by the speech detector 7-4 so that the main controller 7 can know that the emergency call receiving device 5 is calling the mobile subscriber of concern.

The controller 7-5 controls a normal communication request or an emergency speech request from the mobile subscribers ML. For example, the controller 7-5 allocates idle speech channels to communication requests held in the control channel controller 10-0. When notified by the ringing signal detector 7-1, the controller 7-5 accesses the table memory 7 and reads out the number of the mobile subscriber registered in the accessed storage area. Then the controller 7-5 sends the corresponding mobile subscriber the ringing signal. Moreover, the controller 7-5 writes the number of the the mobile subscriber which requests an emergency speech into the area B and flags into the aforementioned areas C and D of the table memory 7-2.

Figure 5A:
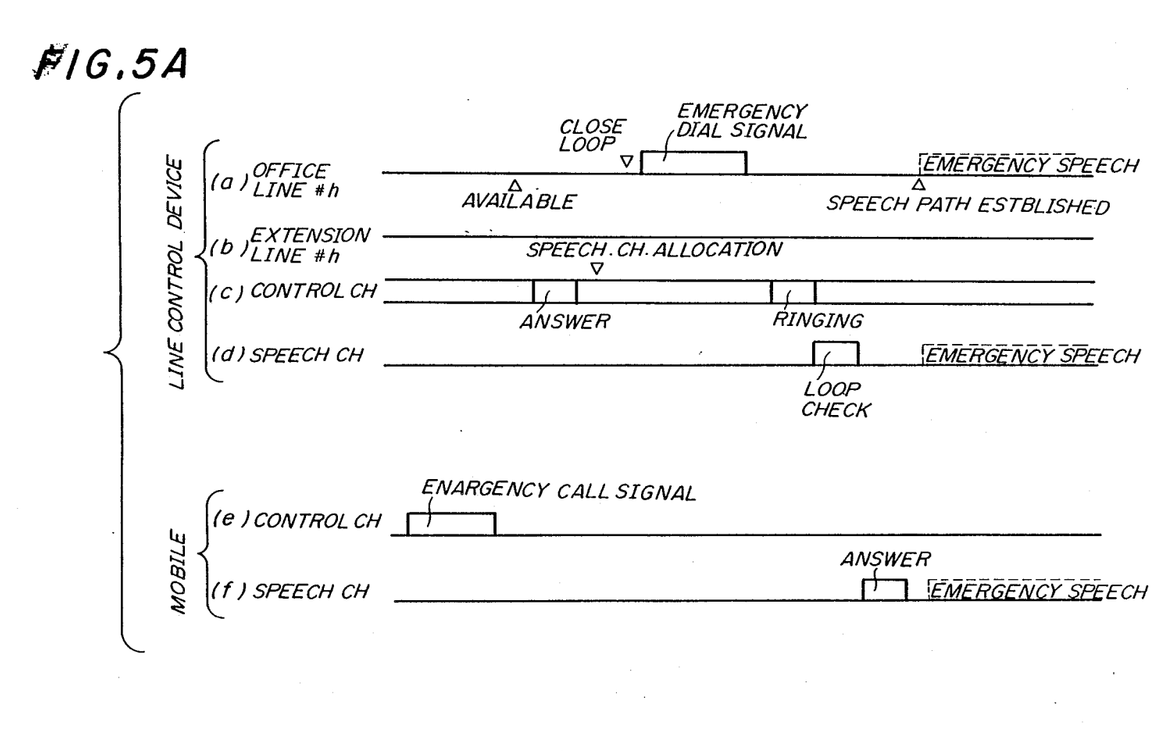
FIGS. 5A, 5B and 5C are respectively timing charts illustrating the operation of the configuration shown in FIG. 3.
Figure 5B:
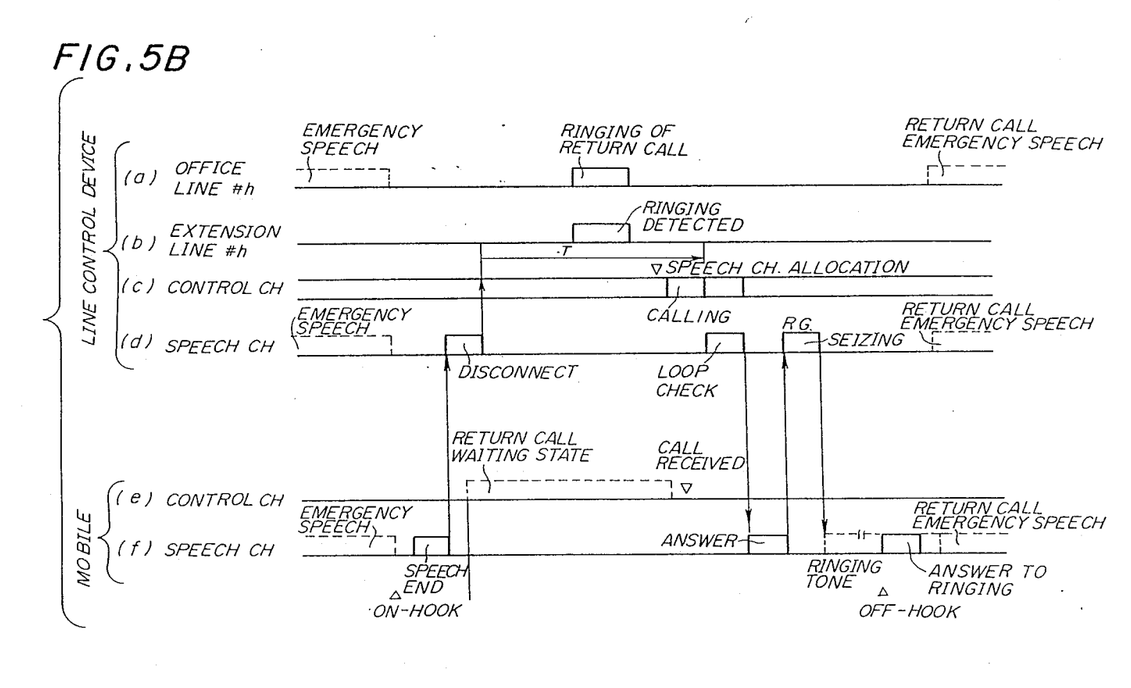
Figure 5C:
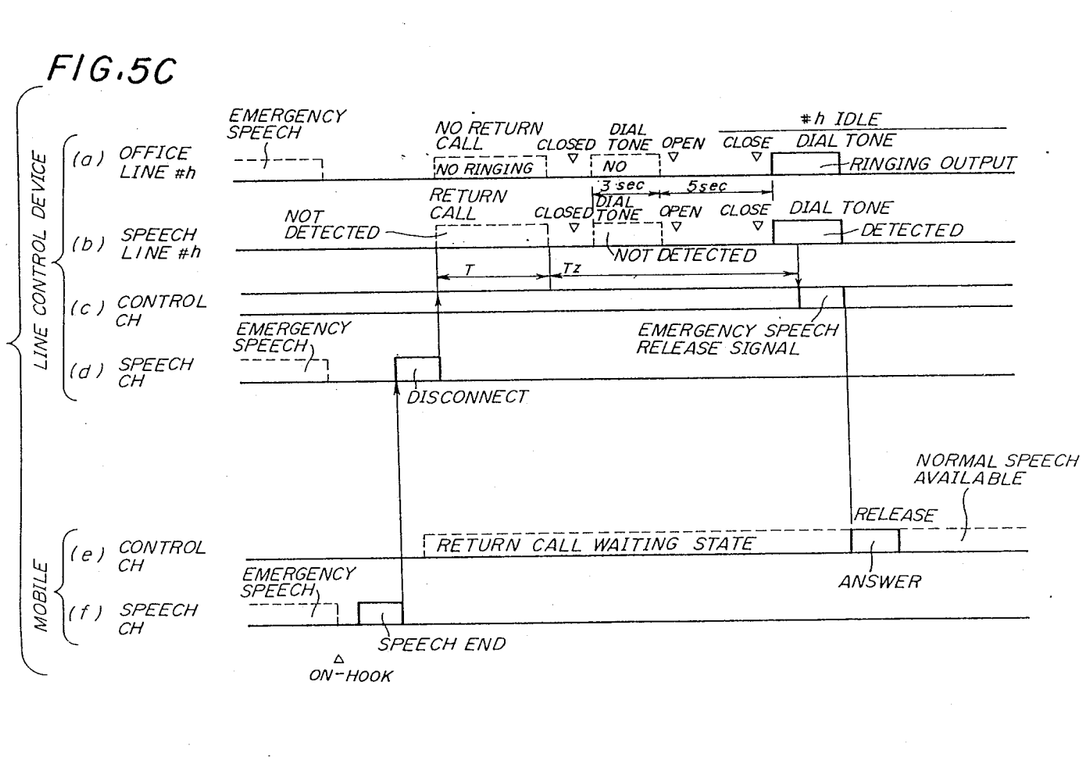

A description is given of the operation of the present embodiment with reference to FIGS. 5A, 5B and 5C. FIG. 5A is a time chart illustrating an emergency speech sequence which is executed at the start of emergency communication. FIG. 5B is a time chart illustrating an emergency speech sequence which is executed after finishing the emergency speech and generating a call directed to the mobile subscriber from the associated emergency call receiving device 5. FIG. 5C is a time chart illustrating an emergency speech sequence which is executed when no return call directed to a mobile subscriber is generated from an emergency call receiving device which is in the return call waiting state.

Referring to FIG. 5A, the mobile subscriber ML generates an emergency speech request (emergency call signal) by dialing a specific emergency dial number through the control channel (FIG. 5A(e)). The emergency call signal is sent through the control channel to the control channel controller 10-0 of the line controller 20 via the antenna duplexer 3 and the base station radio device 2, and is temporarily held therein.

The controller 7-5 accesses the table stored in the table memory 7-2, for example, in order of number, and finds that the flag of the emergency speech office line #h in the area C is "1", or idle (FIG. 5A(a)). Then the controller 7-5 instructs the control channel controller 10-0 to send an answer to the emergency call signal. At this time, the controller 7-5 writes the subscriber number #M of the mobile subscriber ML in the area B relating to the emergency speech office line #h. On the other hand, the controller 7-5 allocates the speech extension line X to the present emergency speech request (FIG. 5A(c)). In response to the instruction from the controller 7-5, the controller 10-0 sends the answer to the mobile subscriber ML (FIG. 5A(c)), and sets the flags in the areas E and D to "0" and "1", respectively.

On the other hand, a D.C. loop of the emergency speech office line #h is formed and, thus, the emergency dial number contained in the emergency call signal together with the subscriber number of the mobile station ML is sent to the emergency speech office line #h (FIG. 5A(a)). The controller 7-5 lets the base station radio device 2 know that the speech extension line X is allocated to the present emergency speech request (FIG. 5A(c)). The speech channel controller 10-e of the speech extension line X determines whether the speech extension line X is in the closed state when a D.C. loop is formed (FIG. 5A(d)). In response to this loop check, a confirmation is answered from the mobile subscriber ML (FIG. 5A(f)). Thus, the emergency communication path between the mobile subscriber ML and the emergency call receiving device 5 connected to the emergency speech office line #h via route ①is established. In this state, emergency speech communication between the emergency call receiving device 5 and the mobile subscriber ML is enabled.

Referring to FIG. 5B, when finishing the emergency speech, the mobile subscriber ML sets its handset in the on-hook state. In response to this operation, the mobile subscriber ML outputs a speech end signal (FIG. 5B(f)), and the speech channel controller 10-e of the line controller 20 outputs a disconnect signal so that the present speech channel is released (FIG. 5B(d)). At this time, the controller 7-5 sets the flag in the area D to "0" and sets the flag in the area E to "1". Further, the controller 7-5 starts an internal timer (program timer), and monitors the presence/absence of a ringing signal supplied from the ringing signal detector 7-1 for T seconds (FIG. 5B(b)). When the ringing signal detector 7-1 detects a ringing signal transmitted via the emergency speech office line #h and the emergency speech extension line #h before the lapse of T seconds (FIG. 5B(a), (b)), it notifies the controller 7-5 of the detection of the ringing signal. Then the controller 7-5 captures an idle speech extension line and, on the other hand, reads out the contents of the table memory 7-2 relating to the emergency speech office line #h. Thereby the controller 7-5 knows the mobile subscriber ML to be called has the mobile subscriber number #M, and then generates a call signal directed to the mobile subscriber number #M through the control channel. In the example shown in FIG. 3, the speech extension line Y is captured by the controller 7-5. The controller 7-5 instructs the speech channel controller 10-d provided for the speech extension line Y so as to perform a loop check (FIG. 5B(d)). Then, the mobile subscriber ML sends an answer to the loop check (FIG. 5B(f)). Then the speech channel controller 10-d outputs a ringing signal to the mobile subscriber ML (FIG. 5B(d)) and rings a bell thereof (FIG. 5B(f)). The operator of the mobile subscriber ML lifts up the handset and responds to the ringing so that emergency speech can be done through the route ③.

Referring to FIG. 3C, when finishing the emergency speech and setting the handset in the on-hook state, the mobile subscriber ML sends an end signal through the speech channel (FIG. 5C(f)). The speech channel controller 10-d receives the end signal from the mobile subscriber ML, and generates a disconnect signal. The controller 7-5 checks the presence/absence of the ringing signal for T seconds from the ringing signal detector 7-1 (FIG. 5C(b)). When no detection signal from the ringing signal detector 7-1 is obtained even after the lapse of T seconds, the controller 7-5 makes the dial tone detector 7-3 active. That is, the dial tone detector 7-3 determines whether or not the dial tone from the corresponding emergency speech office line #h is detected by repeatedly performing a calling operation at a predetermined period. For example, the dial tone detector 7-3 decides the presence/absence of the dial tone at a cycle in which the loop of the emergency speech extension line #h is closed for 3 seconds and subsequently the loop is made open for 5 seconds. This operation is repeatedly carried out in turn for Tz seconds for every emergency speech office line 14. When the dial tone detector 7-3 detects the dial tone supplied from the emergency speech office line #h, the controller 7-5 makes a decision that the emergency speech office line #h has been released from the operator of the emergency call receiving device 5 connected thereto. Then the controller 7-5 revises the contents of the table memory 7-2 so that the flags in the areas C, B, D and E relating to the emergency speech office line #h are set to "1", "0", "0" and "0", respectively. Thereafter, the control channel controller 10-0 sends an emergency speech release signal (FIG. 5C(c)). In response to the emergency speech release signal, the mobile subscriber ML sends an answer to this signal through the control channel (FIG. 5C(e)). As a result, normal speech communication becomes possible.

Figure 6:
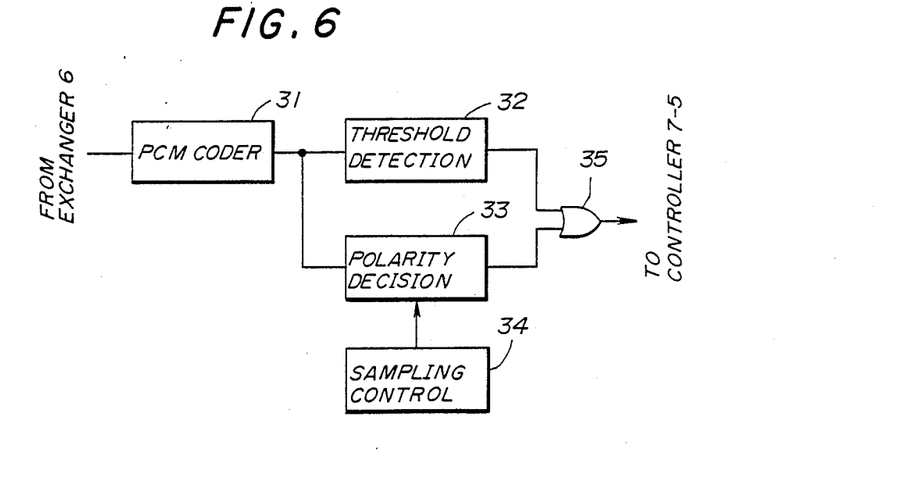
FIG. 6 is a block diagram of a speech detector used in the configuration shown in FIG. 3.

The ringing signal detector 7-1 and the dial tone detector 7-3 are individually provided by the use of conventional LSIs. For example, a marketed LSI chip labeled NE 5900-D (C.P.D: CODE PROGRESS DECODER) can be used for configuring each of the ringing signal detector 7-1 and the dial tone detector 7-3. The speech detector 7-4 has a configuration for each of the emergency speech extension lines 15, as shown in FIG. 6. The speech detector 7-4 is made up of a PCM (pulse code modulation) coder 31, a threshold detection circuit 32, a polarity decision circuit 33, a sampling control circuit 34, and an OR gate 35. The PCM coder 31 encodes a speech signal from the corresponding emergency call receiving device 5 to thereby generate a PCM signal 31, which is composed of a predetermined number of bits. The threshold detection circuit 32 compares the PCM signal with a predetermined audio characteristic, and determines whether or not the PCM signal is an audio signal. When the PCM signal is a noise signal, it does not have the predetermined audio characteristic. On the other hand, when the PCM signal matches with the predetermined audio characteristic, the threshold detection circuit 32 outputs a high-level signal. The polarity decision circuit 33 determines whether the polarities of the consecutive PCM signals each represented by the leading bit thereof alternately changes in synchronism with a sampling timing defined by the sampling control circuit 34. There is a trend in which the polarity of the PCM audio signal changes alternately. When the polarity of the PCM signal from the PCM coder 31 alternately changes, the polarity decision circuit 33 outputs a high-level signal. The signals from the threshold detection circuit 32 and the polarity decision circuit 33 are supplied to the OR gate 35. When the PCM signal is an audio signal, the OR gate 35 outputs a high-level signal, which is supplied to the controller 7-5 (FIG. 3).

The present invention is not limited to the aforementioned embodiments, and variations and modifications may be made without departing from the scope of the present invention.

What is claimed is:

1. A radio telephone system comprising:
   a subscriber exchanger accommodating a plurality of subscribers and a plurality of emergency call receiving devices each having a transmission function;
   a line exchanger interfacing with said subscriber exchanger;
   emergency speech office lines provided between said subscriber exchanger and said line exchanger;
   a plurality of channels coupling mobile stations and said line exchanger;
   emergency speech extension lines coupled to said line exchanger and corresponding to said emergency speech office lines one by one;
   first control means for coupling a mobile station which is one of said mobile stations and requests an emergency speech to one of said emergency call receiving devices through one of said channels, said line exchanger, one of said emergency speech office lines and said subscriber exchanger;
   memory means for storing a subscriber number of said mobile station which requests the emergency speech;
   ringing signal detecting means for detecting a ringing signal supplied from said one of said emergency call receiving devices through said one of said emergency speech office lines and a corresponding one of said emergency speech extension lines and directed to said mobile station which precedingly requests said emergency speech and for generating a detection signal when detecting said ringing signal; and second control means for reading out the subscriber number of said mobile station from said memory means when said detection signal is supplied from said ringing signal detecting means and for coupling said one of the emergency call receiving devices to said mobile station through said subscriber exchanger, said one of said emergency speech office lines, said subscriber exchanger and one of said channels.

2. A radio telephone system as claimed in claim 1, wherein when said emergency speech is finished, said first control means releases said one of the channels from a coupling with said one of the emergency speech receiving devices so that said one of the channels becomes idle.

3. A radio telephone system as claimed in claim 1, wherein said ringing signal detecting means detects said ringing signal for a predetermined time.

4. A radio telephone system as claimed in claim 1, wherein said ringing signal detecting means detects said ringing signal for each of said emergency speech extension lines.

5. A radio telephone system as claimed in claim 1, wherein said memory means has a storage area provided for each of said emergency speech office lines, and wherein said storage area has a first area storing said number of said mobile station, a second area storing a flag indicating whether a corresponding one of said the emergency speech office lines can be used, a third area storing a flag indicating whether said corresponding one of the emergency speech office lines is busy, and a fourth area storing a flag indicating whether said corresponding one of the emergency speech office lines is waiting for said ringing signal supplied therethrough.

6. A radio telephone system as claimed in claim 5, further comprising a third control means for revising said flags stored in said first through fourth areas of said storage area of said memory means.

7. A radio telephone system as claimed in claim 1, further comprising dial tone detecting means for calling said emergency call receiving devices through said emergency speech extension lines, said line exchanger and said emergency speech office lines and for determining whether each of said emergency call receiving devices sends a dial tone signal.

8. A radio telephone system as claimed in claim 7, wherein said ringing signal detecting means detects said ringing signal for a predetermined time, and wherein when said ringing signal detecting means detects no ringing signal for said predetermined time, said dial tone detecting means starts calling said emergency call receiving devices.

9. A radio telephone system as claimed in claim 8, wherein said dial tone detecting means periodically calls said emergency call receiving devices for a definite time.

10. A radio telephone system as claimed in claim 7, wherein said memory means has a storage area provided for each of said emergency speech office lines, and said storage area has an area storing a flag indicating whether or not a corresponding one of said emergency speech office lines is idle, and wherein when said dial tone signal is received from said corresponding one of said emergency speech office lines, said area is provided with flag data indicating that said corresponding one of said emergency speech office lines is idle.

11. A radio telephone system as claimed in claim 1, further comprising speech detecting means provided for each of said emergency speech receiving devices, for detecting whether a speech is supplied from a corresponding one of said emergency speech receiving devices through said subscriber exchanger, a corresponding one of said emergency speech office lines, and a corresponding one of said emergency speech extension lines, wherein said second means couples said corresponding one of said emergency speech receiving devices to said mobile station when said speech is detected.

12. A radio telephone system as claimed in claim 11, wherein said speech detecting means comprises coder means for encoding said speech into a coded signal, and decision making means for determining whether or not said coded signal is an audio signal on the basis of a level and a polarity of said coded signal.

13. A radio telephone system as claimed in claim 1, wherein the number of said emergency speech office lines is equal to that of said emergency speech extension lines.

14. A radio telephone system as claimed in claim 7, wherein when said dial tone detecting means calls each of said emergency call receiving devices, a direct current loop including each of said emergency call receiving devices is formed.

15. A radio telephone system as claimed in claim 1, further comprising:

dial tone detecting means for calling said emergency call receiving devices through said emergency speech extension lines, said line exchanger and said emergency speech office lines and for determining whether each of said emergency call receiving devices sends a dial tone signal; and speech detecting means provided for each of said emergency speech receiving devices, for detecting whether a speech is supplied from a corresponding one of said emergency speech receiving devices through said subscriber exchanger, a corresponding one of said emergency speech office lines, and a corresponding one of said emergency speech extension lines, wherein said second means couples said corresponding one of said emergency speech receiving devices to said mobile station when said speech is detected.

* * * * *